United States Patent
Soderqvist

(10) Patent No.: US 11,384,588 B2
(45) Date of Patent: Jul. 12, 2022

(54) DRIVE ARRANGEMENT FOR DOOR OPERATOR

(71) Applicant: Assa Abloy Entrance Systems AB, Lanskrona (SE)

(72) Inventor: Sven-Gunnar Soderqvist, Vallakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 21 days.

(21) Appl. No.: 17/046,027

(22) PCT Filed: Apr. 17, 2019

(86) PCT No.: PCT/EP2019/059910
§ 371 (c)(1),
(2) Date: Oct. 8, 2020

(87) PCT Pub. No.: WO2019/206759
PCT Pub. Date: Oct. 31, 2019

(65) Prior Publication Data
US 2021/0071462 A1 Mar. 11, 2021

(30) Foreign Application Priority Data
Apr. 23, 2018 (SE) .................................... 1830143-2

(51) Int. Cl.
*E06B 7/00* (2006.01)
*E05F 15/60* (2015.01)
(Continued)

(52) U.S. Cl.
CPC .............. *E05F 15/60* (2015.01); *E05F 15/70* (2015.01); *H02P 7/04* (2016.02);
(Continued)

(58) Field of Classification Search
CPC .. H02P 7/04; H02P 7/291; H02P 29/50; H02P 27/06; E05F 15/60; E05F 15/70;
(Continued)

(56) References Cited

U.S. PATENT DOCUMENTS 4,581,565 A 4/1986 Van Pelt
5,347,755 A * 9/1994 Jaster ...................... E05F 1/046
49/25
(Continued)

FOREIGN PATENT DOCUMENTS

WO 9732389 9/1997

OTHER PUBLICATIONS

Kato T et al.: "Modified Hysteresis Control with Minor Loops for Single-Phase Full-Bridge Inverters", Conference Record of the Industry Applications Society Annual meeting (IAS). Pittsburgh, Oct. 2-7, 1998; vol. CONF. 23, No. PART 1, 1998, Oct. 2, 1988, pp. 689-693, XP000011680, abstract.
(Continued)

*Primary Examiner* — Chi Q Nguyen
(74) *Attorney, Agent, or Firm* — Wissing Miller LLP

(57) ABSTRACT

Method (100) for controlling a drive arrangement (200) for an automatic door operator (30) of an entrance system (10) having one or more movable door members (D1 ... Dm), whereby the automatic door operator (30) is for causing movements of the one or more movable door members (D1 ... Dm) between a closed position and an opened position, respectively. The drive arrangement (200) comprises a DC-motor (34) for driving the automatic door operator (30), a H-bridge (96) and a controller (32, 232) for controlling the drive arrangement (200). The H-bridge (96) comprises a first leg (A) and a second leg (B), the first leg (A) and second leg (B) both being connected to a first voltage supply line (97) and a second voltage supply line
(Continued)

(98), the first voltage supply line (97) having a higher voltage than the second voltage supply line (98).

20 Claims, 5 Drawing Sheets

(51) Int. Cl.
    *E05F 15/70*     (2015.01)
    *H02P 7/03*     (2016.01)
(52) U.S. Cl.
    CPC ..... *E05Y 2201/434* (2013.01); *E05Y 2400/61* (2013.01); *E05Y 2900/132* (2013.01)
(58) Field of Classification Search
    CPC ........... E05Y 2201/434; E05Y 2400/61; E05Y 2900/132
    USPC ............................................................ 49/70
    See application file for complete search history.

(56) References Cited

U.S. PATENT DOCUMENTS

| | | | |
|---|---|---|---|
| 5,428,522 A | | 6/1995 | Millner et al. |
| 5,755,060 A | * | 5/1998 | Zweili ................ E05B 65/0829 49/322 |
| 6,634,140 B1 | * | 10/2003 | Sellman .................. E05F 15/41 49/340 |
| 2003/0025469 A1 | | 2/2003 | Zhou |
| 2004/0118638 A1 | | 6/2004 | Delaporte |
| 2005/0028946 A1 | * | 2/2005 | Weishar ................ E05F 15/643 160/214 |
| 2005/0140316 A1 | * | 6/2005 | Orsat ........................ E06B 9/68 318/16 |
| 2005/0274078 A1 | * | 12/2005 | Gilchrist ................ E05F 15/42 49/360 |
| 2007/0108927 A1 | * | 5/2007 | Valencia ............... E05F 15/643 318/282 |
| 2008/0295408 A1 | * | 12/2008 | Heissler ................ E05F 15/619 49/324 |
| 2015/0303850 A1 | | 10/2015 | Nagaraj |
| 2017/0067280 A1 | * | 3/2017 | Thomas ................ E05F 15/605 |
| 2018/0099568 A1 | * | 4/2018 | Ishigaki ................ B60L 53/80 |
| 2018/0266169 A1 | * | 9/2018 | Wray ........................ E06B 7/16 |
| 2019/0085600 A1 | * | 3/2019 | Leonardi ............... E05F 15/622 |

OTHER PUBLICATIONS

International Search Report and Written Opinion mailed in PCT/EP2019/059910 dated Jul. 26, 2019.

Swedish Search Report mailed in SE 1830143-2 dated Apr. 23, 2018.

Jahns, T M "Designing Intelligent Muscle into Industrial Motion Control" IEEE Transactions on Industrial Electronics, vol. 37, Issue 5, pp. 329-341 Oct. 1990; DOI: 10.1109/41. 103427.

* cited by examiner

DRIVE ARRANGEMENT FOR DOOR OPERATOR

This application is a 371 of PCT/EP2019/059910 filed on Apr. 17, 2019, published on Oct. 31, 2019 under publication number WO 2019/206759, which claims priority benefits from Swedish Patent Application No. 1830143-2, filed on Apr. 23, 2018, the disclosure of which is incorporated herein by reference.

TECHNICAL FIELD

Present invention relates to a drive arrangement for an automatic door operator and a method for controlling a drive arrangement for an automatic door operator. Present invention further relates to an automatic door operator comprising said drive arrangement.

BACKGROUND

In many control applications for door automation is it necessary to control several states to get a good control behavior. When using electrical motors the inner loop is often the current control loop. In the current loop it is important to achieve the desired current as fast as possible while keeping additional losses at a minimum.

To achieve a desirable control behavior, conventional drive arrangement with DC motors often utilize Pulse Width Modulation PWM. As is well known in the field, PWM is a method where the signal is integrated and the result is compared with limits which correspond to a reference signal offset by a constant. Every time the integral of the output signal reaches one of the limits, the PWM signal changes state. This allows for control of for example a DC-motor with a very high precision.

PWM is also known as duty-cycle variation. The voltage is modulated as digital high and low signals, whereby the duty cycle is defined as a ratio. The ratio may be in the form of a percentage obtained by digital high to low and digital high pulse width during a PWM-period. The duty cycle max value is 100% which equals a DC waveform. Hence, the average voltage across the DC-motor can be varied so as to control the speed of said DC-motor.

To avoid power loss during switching during the transients during PWM control of a DC-motor the switching frequency the switching is usually kept as fast as possible. The losses in the DC-motor increases with increased ripple current while the torque is proportional to the average current. As a result, the losses are the highest during the switching. Thus, there may be a need for a faster switching time and high switching frequency in order to prevent excessive energy loss.

However, an increased switching frequency causes an increase in electromagnetic interference EMI which is associated with disturbances in electrical equipment as well as wireless communication.

It is especially important in the field of automated entrance systems both due to the potential disturbances and strict regulation to keep EMI at sufficiently low level. Entrance systems, especially automated entrance systems, are commonly used in common areas with large groups of people carrying electrical equipment passing by each day and in public buildings relying on electrical central control systems. Therefore, excessive EMI is particularly important to minimize due to the potentially large effects on the surrounding area.

Also, conventional automated entrance systems are often manufactured largely in metal. The metal components of the entrance system may thus function as an antenna for the EMI, further strengthening the interference in the surrounding area which further accentuates the importance of keeping EMI emitted from the drive arrangement at a low level.

Also, drive arrangements for automatized entrance systems are subjected to malfunction, wear and sometimes even sabotage and other human interference. Thus, the DC-motors of the drive arrangement may require replacing from time to time. Due to the inherent differences in parameters between different DC-motors this may require substantial calibration. Hence, there is a need to achieve a drive arrangement which may allow for a replacement of the DC-engine without requiring complex and time consuming trimming procedures.

The present inventor has realized that there is room for improvement in this field.

SUMMARY

An object of the present invention is therefore to provide one or more improvements in the field of entrance systems having automatic door operators for causing movements of one or more movable door members between closed and open positions.

Accordingly, a first aspect of the present invention is method for controlling a drive arrangement for an automatic door operator of an entrance system having one or more movable door members, whereby the automatic door operator is for causing movements of the one or more movable door members between a closed position and an opened position, respectively.

The drive arrangement comprises a DC-motor for driving the automatic door operator, a H-bridge and a controller for controlling the drive arrangement.

The H-bridge comprises a first leg and a second leg, the first leg and second leg both being connected to a first voltage supply line and a second voltage supply line. The first voltage supply line has a higher voltage than the second voltage supply line.

The first leg comprises an upper first leg switch and a lower first leg switch connected in series. The second leg comprises an upper second leg switch and a lower second leg switch connected in series.

The DC-motor is connected to the first leg and the second leg between the upper first leg switch and the lower first leg switch and the upper second leg switch and the lower second leg switch, respectively.

The method according to the first aspect comprises switching to an active state of the drive arrangement, wherein the upper first leg switch and the lower second leg switch are activated and wherein the lower first leg switch and the upper second leg switch are deactivated.

The method further comprises measuring a DC-motor current from the DC-motor and comparing the DC-motor current to a first reference current.

Further, the method comprises switching to a pause state of the drive arrangement, wherein only the upper leg switches or the lower leg switches are activated, when the DC-motor current (IDC) exceeds the first reference current and switching back to the active state when the DC-motor current falls below a second reference current.

A second aspect of the invention is a drive arrangement for an automatic door operator of an entrance system having one or more movable door members. The automatic door operator is for causing movements of the one or more movable door members between a closed position and an opened position, respectively.

The drive arrangement comprises a DC-motor for driving the automatic door operator, a H-bridge and a controller for controlling the drive arrangement.

The H-bridge comprises a first leg and a second leg, the first leg and second leg are both connected to a first voltage supply line and a second voltage supply line. The first voltage supply line has a higher voltage than the second voltage supply line.

The first leg comprises an upper first leg switch and a lower first leg switch connected in series and the second leg comprises an upper second leg switch and a lower second leg switch connected in series. The DC-motor is connected to the first leg and the second leg between the upper first leg switch and the lower first leg switch and the upper second leg switch and the lower second leg switch, respectively.

In one embodiment, the DC-motor is connected to a current sensor configured to measure a DC-motor current from the DC-motor, wherein the controller is configured to switch to an active state of the drive arrangement, wherein the upper first leg switch and the lower second leg switch are activated and wherein the lower first leg switch and the upper second leg switch are deactivated.

The controller may be further configured to compare the DC-motor current to a first reference current and switch to a pause state of the drive arrangement, wherein the upper leg switches or the lower leg switches are deactivated, when the DC-motor current exceeds the first reference current.

Advantageously, the controller is further configured to switch back to the active state when the DC-motor current falls below a second reference current.

A third aspect of the invention is an automatic door operator for an entrance system having one or more movable door members, whereby the automatic door operator is for causing movements of the one or more movable door members between a closed position and an opened position, respectively.

The automatic door operator comprises a drive arrangement according to the second aspect of the invention.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

DETAILED DESCRIPTION OF EMBODIMENTS

Figure 1:
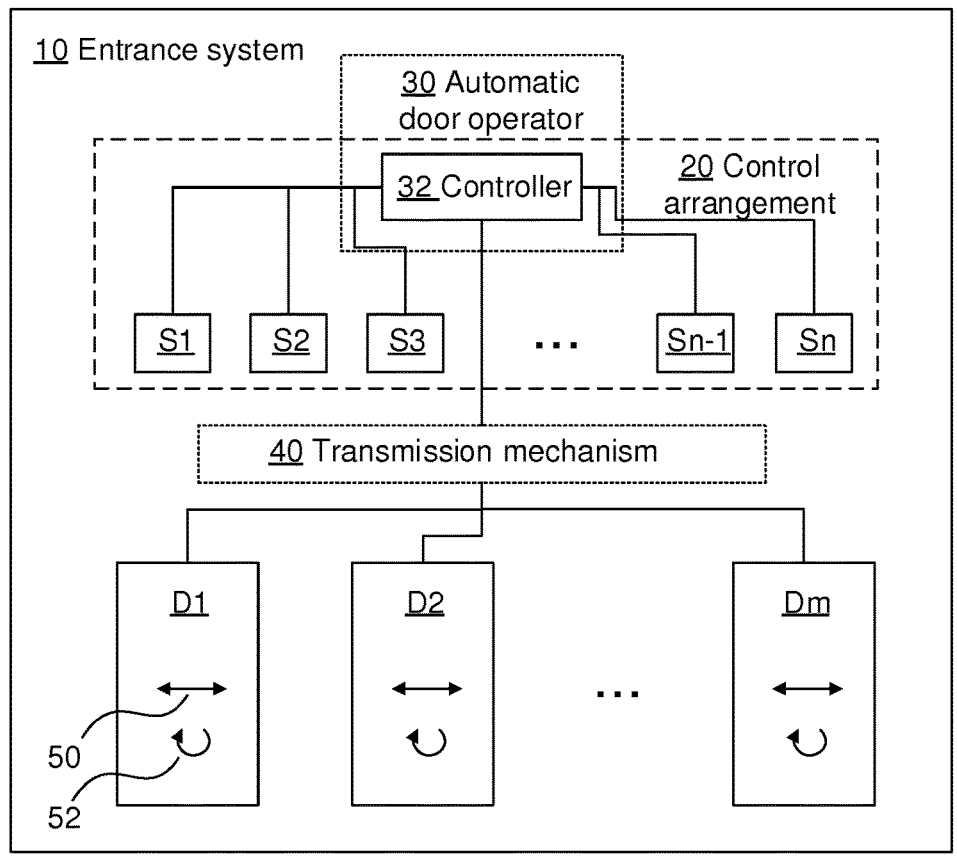
FIG. 1 is a schematic block diagram of an entrance system generally according to the present invention.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 2:
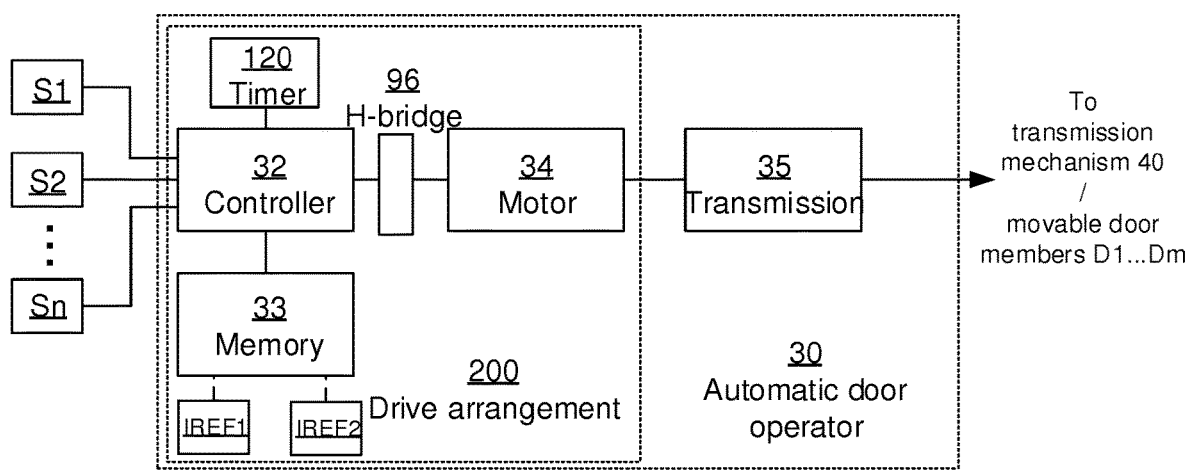
FIG. 2 is a schematic block diagram of an automatic door operator which may be included in the entrance system shown in FIG. 1.

FIG. 1 is a schematic block diagram illustrating an entrance system 10 in which the inventive aspect of the present invention may be applied. The entrance system 10 comprises one or more movable door members D1 . . . Dm, and an automatic door operator 30 for causing movements of the door members D1 . . . Dm between closed and open positions. In FIG. 1, a transmission mechanism 40 conveys mechanical power from the automatic door operator 30 to the movable door members D1 . . . Dm. FIG. 2 illustrates one embodiment of the automatic door operator 30 in more detail.

Pursuant to the invention, a control arrangement 20 is provided for the entrance system 10. The control arrangement 20 comprises a controller 32, which may be part of the automatic door operator 30 as seen in the embodiment of FIG. 2, but which may be a separate device in other embodiments. The control arrangement 20 also comprises a plurality of sensors S1 . . . Sn. Each sensor is connected to the controller 32 by wired connections, wireless connections, or any combination thereof. As will be exemplified in the subsequent description of the two different embodiments in FIGS. 5 and 6, each sensor is configured to monitor a respective zone Z1 . . . Zn at the entrance system 10 for presence or activity of at least one person or object.

The embodiment of the automatic door operator 30 shown in FIG. 2 will now be described in more detail. The automatic door operator 30 may typically be arranged in conjunction with a frame or other structure which supports the door members D1 . . . Dm for movements between closed and open positions, often as a concealed overhead installation in or at the frame or support structure.

In addition to the aforementioned controller 32, the automatic door operator 30 comprises a motor 34, typically an electrical motor, being connected to an internal transmission or gearbox 35. An output shaft of the transmission 35 rotates upon activation of the motor 34 and is connected to the external transmission mechanism 40. The external transmission mechanism translates the motion of the output shaft of the transmission 35 into an opening or a closing motion of one or more of the door members D1 . . . Dm with respect to the frame or support structure.

The motor 34 is preferably a DC-motor 34. The DC-motor 34 constitutes a part of a drive arrangement, which will be described in further detail later on with reference to FIG. 3A-B.

In one embodiment, the automatic door operator 30 may further comprise a self-closing arrangement. The self-closing arrangement may be arranged to provide a closing force to the one or more movable door members. Said closing force may be applied parallel to a potential closing force applied to the movable door member by means of the motor 34 and the transmission 35. The self-closing arrangement may for example be in the form of a spring arrangement, i.e. a preloaded spring arrangement, or a plummet arrangement connected to the one or more movable door members.

In one embodiment, the automatic door operator 30 may further comprise a dampening arrangement adapted to reduce the closing speed and/or the opening speed of the one or more movable door members.

Figure 3A:
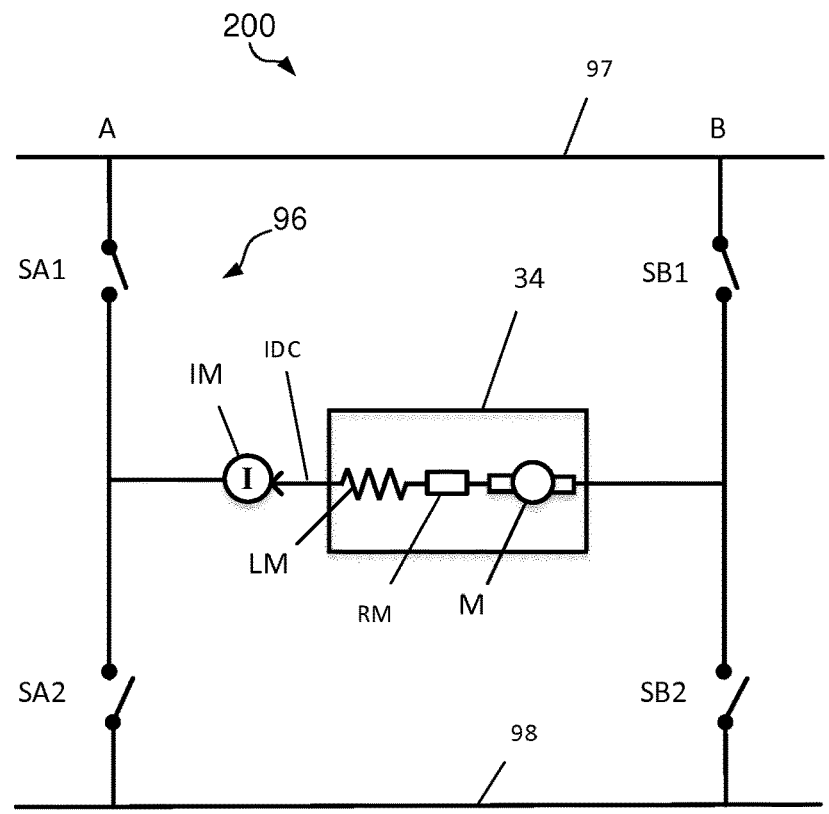
FIG. 3a is a schematic figure of a drive arrangement according to one embodiment.
Figure 3B:
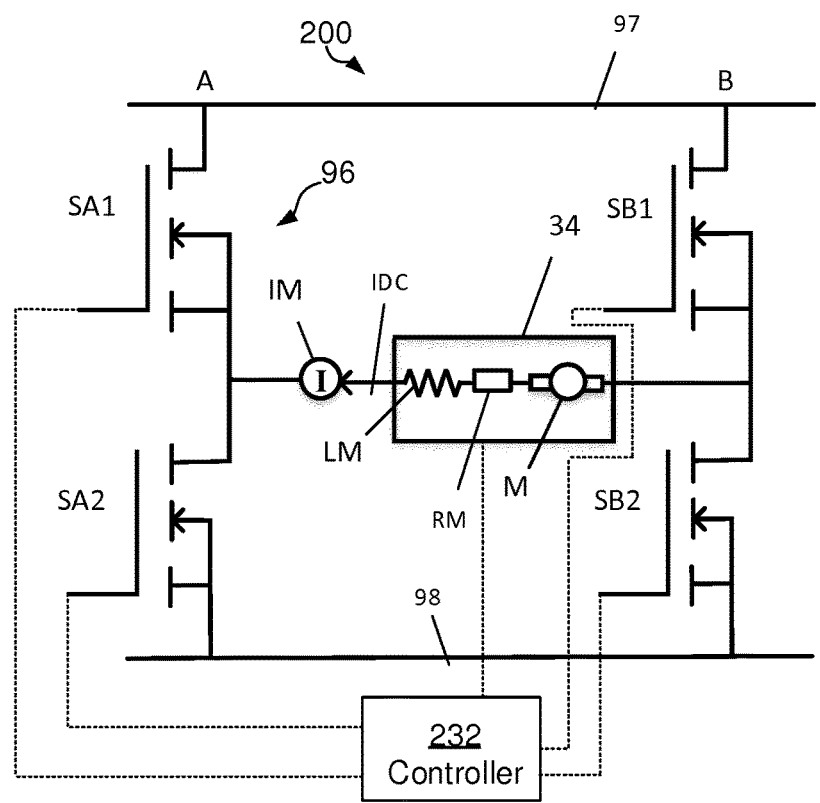
FIG. 3b is a schematic figure of a drive arrangement according to one embodiment.

Referring to said FIG. 3a-b, the DC-motor 34 is depicted as a non-ideal DC-motor 34 with an ideal DC-motor M in series with an inductor LM and a resistance RM. As is well known in the field DC-motors are subjected to losses in the form of mechanical losses and electrical losses. Due to said losses both inductivity and resistance occurs in the circuit.

Since the DC-motor 34 is a non-ideal DC-motor, the induction L due to the losses of the circuit with said DC-motor 34 provides a voltage U according to the following:

$$U = L\frac{di(t)}{dt} \quad (1)$$

Referring to above presented Equation 1, the voltage U provided by the induction in the circuit is proportional to the time derivative of the current I flowing through the inductor LM and is the product of said derivate of the current I and the inductivity L of the inductor LM. The current I is thus the current provided by the DC-motor 34.

Due to the inductivity L being substantially constant, rapid changes in current will lead to a large positive or negative current time derivative. As a result the voltage U will spike, a phenomenon known as ripple voltage.

The controller 32 is configured for performing different functions of the automatic door operator 30 in the different operational states of the entrance system 10, using inter alia sensor input data from the plurality of sensors S1 . . . Sn. Hence, the outputs of the plurality of sensors S1 . . . Sn are connected to data inputs of the controller 32. At least some of the different functions performable by the controller 32 have the purpose of causing desired movements of the door members D1 . . . Dm. To this end, the controller 32 has at least one control output connected to the DC-motor 34 for controlling the actuation thereof.

The controller 32 may be implemented in any known controller technology, including but not limited to microcontroller, processor (e.g. PLC, CPU, DSP), FPGA, ASIC or any other suitable digital and/or analog circuitry capable of performing the intended functionality.

The controller 32 also has a memory 33, i.e. an associated memory. The memory 33 may be implemented in any known memory technology, including but not limited to E(E)PROM, S(D)RAM or flash memory. In some embodiments, the memory 33 may be integrated with or internal to the controller 32. The memory 33 may store program instruction for execution by the controller 32, as well as temporary and permanent data used by the controller 32.

According to an embodiment, the drive arrangement for driving the movable door members comprises the DC-motor 34 as well as power electronics. The drive arrangement is depicted in FIG. 3a-b.

The drive arrangement 200 is for the automatic door operator 30 of the entrance system 10 having one or more movable door members D1 . . . Dm. Accordingly, the automatic door operator 30 is for causing movements of the one or more movable door members D1 . . . Dm between a closed position and an opened position, respectively.

The drive arrangement 200 comprises a DC-motor 34 for driving the automatic door operator 30, a H-bridge 96 and a controller 32 for controlling the drive arrangement 200.

The controller may be the main controller of the automatic door operator 32 or a separate drive arrangement controller 232 as schematically depicted in FIG. 3b.

The H-bridge 96 comprises a first leg A and a second leg B, the first leg A and second leg B are both connected to a first voltage supply line 97 and a second voltage supply line 98. The first voltage supply line 97 has a higher voltage than the second voltage supply line 98. Accordingly, the first and second voltage supply line are configured to provide an electric potential over the H-bridge 96.

The first voltage supply line 97 and the second voltage supply line 98 may be a DC+ supply line and a DC− supply line. Said supply lines may be operatively connected to a power source such as a battery or electrical terminal of the door operator or the drive arrangement as is conventional and well-known in the field.

H-bridges are occasionally implemented in the field of DC-motor drive arrangements. In most cases, H-bridges are utilized in conjunction with DC-motors for allowing DC-motor drive to both forwards and backwards. In a H-bridge four switches, either solid-state or mechanical, are controlled so as to selectively reverse the voltage which allows reversing of the DC-motor.

H-bridges are also utilized to brake a motor by means of shorting of the terminals of the motor or allowing the motor to free-run to a stop by effectively disconnecting the motor from the circuit via selective activation of the four switches of the H-bridge.

According to an embodiment, the first leg A comprises an upper first leg switch SA1 and a lower first leg switch SA2 connected in series and the second leg B comprises an upper second leg switch SB1 and a lower second leg switch SB2 connected in series.

The DC-motor 34 is connected to the first leg A and the second leg B between the upper first leg switch SA1 and the lower first leg switch SA2 and the upper second leg switch SB1 and the lower second leg switch SB2, respectively.

The DC-motor 34 is connected to a current sensor IM configured to measure a DC-motor current IDC from the DC-motor 34.

The switches SA1, SA2, SB1, SB2 may be of any conventional type. Said switches may accordingly be relays or transistors.

With reference to FIG. 3b, the switches SA1, SA2, SB1, SB2 are transistors. Transistors allows for higher switching frequencies and a lower driving voltage in comparison to relays. Further, transistors also usually provide the same functionality of relays with a lower physical size. In the field of automatic door operators, the driving voltage is usually quite low and the space provided for the drive arrangement may be quite limited, whereby transistors allows for a more space-efficient and more stable drive arrangement 200.

In one embodiment, the upper leg switches SA1, SB1 may be p-channel transistors and the lower leg switches SA2, SB2 are n-channel transistors. Thus, the upper leg switches SA1, SB1 are p-channel MOSFETs (metal oxide semiconductor field efficient transistors) directly connected to the first voltage supply line 97 and the lower leg switches SA2, SB2 are n-channel MOSFETs directly connected to the second voltage supply line 98.

Thereby, no additional components in the form of for example inverters are required in order to achieve the desired function. The complexity of the drive arrangement may as a result be reduced, allowing for a more cost-efficient and responsive drive arrangement.

In one embodiment, each of the switches SA1, SA2, SB1, SB2 may be n-channel transistors. Thus, the gates of the high side MOSFETs must be driven positive with respect to the DC supply rail. Only utilizing n-channel transistors allows for high controllability to a low cost. Further, n-channel transistors is advantageous in terms of noise immunity in comparison to p-channel transistors.

In one embodiment, the n-channel transistors may each comprise integrated circuit MOSFET gate drivers with charge pumps to achieve this. Accordingly, a more efficient H-bridge 96 arrangement may be achieved at a lower cost.

In one embodiment, each of the switches SA1, SA2, SB1, SB2 may be insulated-gate bipolar transistors (IGBT). This may be particularly advantageous in entrance systems with large and heavy door leafs due to the DC-motor in such application often operates at higher voltages and currents. At those conditions IGBT are often more advantageous.

Although the controller 232 is depicted as a separate drive arrangement controller, i.e. not the main controller 32 of the door operator, it is noted that the controller may be of any type capable of controlling the drive arrangement. It is further noted that any type of conventional switches may be utilized in combination with said controller. The controller 32 or 232 is operatively connected to the DC-motor 34 as well as the switches so as to allow for control.

Figure 4A:
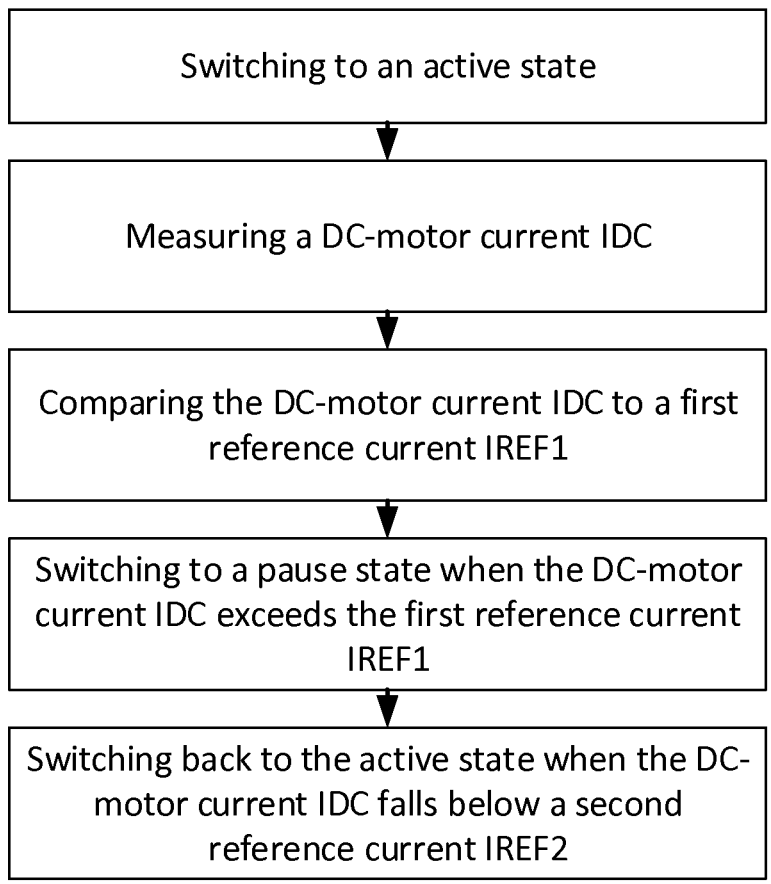
FIG. 4a is a flow-chart of a method for controlling a drive arrangement according to one embodiment.

With reference to FIG. 4a a method 100 for controlling the drive arrangement 200 is depicted. The method comprises the steps of switching to between an active state and a pause state of the drive arrangement 200.

In the active state the upper first leg switch SA1 and the lower second leg switch SB2 are activated and the lower first leg switch SA2 and the upper second leg switch SB2 are deactivated.

In the pause state, only the upper leg switches SA1 and SB1 or the lower leg switches SA2 and SB2 are activated. Accordingly, the pause state may be initiated both by the lower leg switches SA2 and SB2 being activated while the upper leg switches SA1 and SB1 are deactivated as well as by the upper leg switches SA1 and SB1 being activated while the lower leg switches SA2 and SB2 are deactivated.

To allow for the switching to match the desired DC-motor switching frequency the DC-motor current IDC from the DC-motor is measured. The method may thus further comprises measuring said DC-motor current IDC.

The DC-motor current IDC is compared to a first reference current IREF1.

When the DC-motor current IDC exceeds said first reference current IREF1, the method further involves switching from the active state to the pause state.

In accordance with the desired DC-motor switching frequency, the method further comprises switching back to the active state when the DC-motor current IDC falls below a second reference current IREF2.

The first and second reference currents IREF1 and IREF2 are associated with current setpoints of the DC-motor 34. Preferably, the first and second reference currents IREF1 and IREF2 are substantially equally high, whereby the absolute value of the first reference current IREF1 substantially equals the absolute value of the second reference current IREF2. Preferably, IREF1 equals IREF2.

The states of the drive arrangement and switches are schematically depicted in the table below.

TABLE 1

The signals and states of the drive arrangement

| States | switch signals | | | |
|---|---|---|---|---|
| | SA1 | SA2 | SB1 | SB2 |
| pause state | 0 | 1 | 0 | 1 |
| active state | 1 | 0 | 0 | 1 |
| pause state | 1 | 0 | 1 | 0 |
| reverse active state | 0 | 1 | 1 | 0 |

Referring to Table 1, current flows from the first voltage supply line 97 through the upper leg first switch SA1 through the DC-motor 34 and through the lower second leg switch SB2 towards the second voltage supply line 98 in the active state. This being due to the lower first leg switch SA2 and the upper leg switch SB1 being deactivated. The active state is hence hereinafter defined as a state where current supply between the first voltage supply line 97 and the second voltage supply line 98 is inhibited.

In the pause state, the current is disallowed to flow from the first voltage supply 97 to the second voltage supply 98, whereby the drive arrangement 200 is consequently in a paused state. As a result of the comparison with the reference current this is timed with the switching of the DC-motor 34. The pause state is herein defined as a state where current supply between the first voltage supply line 97 and the second voltage supply line 98 is prohibited.

The pause state may be achieved by only the upper leg switches SA1 and SB1 being active, whereby the current is disallowed to flow to the second supply terminal 98 by means of the lower leg switches SA2 and SB2 being deactivated.

The pause state may also be achieved by only the lower leg switches SA2 and SB2 being active, whereby the current is disallowed to enter the H-bridge 96 from the first voltage supply line 97 due to the upper leg switches SA1 and SB1 being deactivated.

Figure 4B:
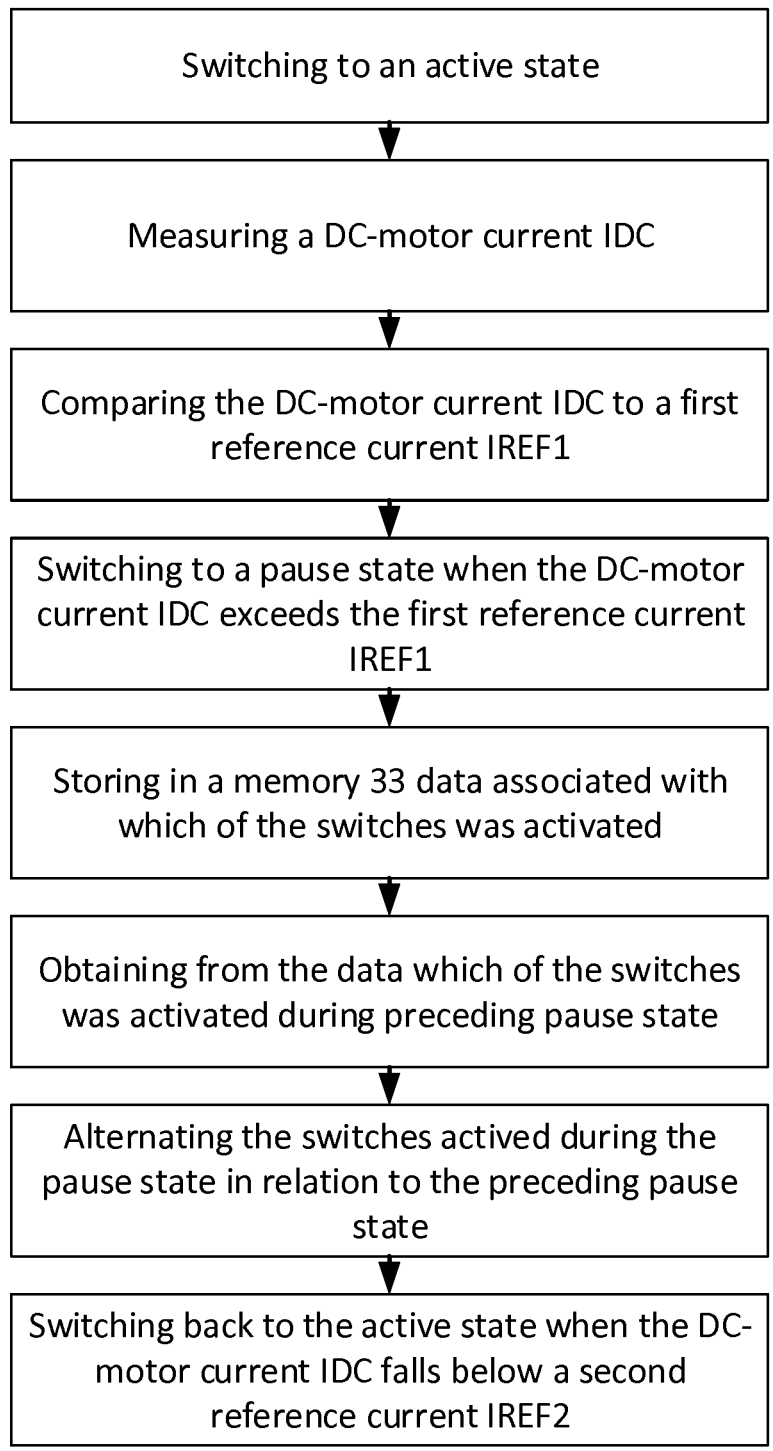
FIG. 4b is a flow-chart of a method for controlling a drive arrangement according to one embodiment.

With reference to FIG. 4 as well as Table 1, a reverse torque state, i.e. an active state of the drive arrangement 200 where the DC-motor provides torque in a reverse direction, i.e. where the first lower leg switch SA2 and the second upper leg switch SB1 are activated and the first upper leg switch SA1 and the second lower leg switch SB2 are deactivated may be avoided during normal drive of the drive arrangement 200.

Accordingly, the drive arrangement 200 is controlled so as to revert directly back to the active state after each pause without reversing the DC-motor current IDC. Thus, only positive current from the DC-motor is utilized, whereby the pause state is withheld until the DC-motor again provides the sufficient positive current. Thereby, the switching frequency is substantially reduced since the number of active pulses of the drive arrangement 200 is reduced. This causes a reduction of EMI and may further lead to reduced losses in the drive arrangement 200 in total.

Thus, the method for controlling the drive arrangement 200 may further comprise switching back to the active state without entering said reverse active state.

Reduction of EMI and switching frequency is particularly important in the field of automated entrance systems, due to such entrance systems often being present in public areas with large number of people as well as electronic equipment.

Also, the automatic entrance system often comprise large metal components, such as for example door leafs, door frame, door operator casings etc. The metal components may propagate and enhance the strength of the EMI emitted by the drive arrangement. Further increasing the risk of the EMI negatively impacting the surroundings of the automated entrance system.

In public areas there may for example be pets present, pets such as dogs has a different frequency hearing and may potentially hear the frequency emitted by the drive arrangement causing them both discomfort and stress.

Furthermore, automated entrance systems are commonly used in public buildings where large numbers of portable electronic device as well as central electronic systems may be present. In some public buildings such as hospitals there may also be critical equipment being very sensitive to any interference such as measuring devices. Accordingly, a reduced EMI is particularly important for a drive arrangement for an automatic drive operator.

Referring to FIG. 3a-b, both of the switches of each leg A and B are not active at the same time to avoid shorting of the first voltage supply line 97. This shorting condition is known in the field as shoot-through and may result in the H-bridge as well as the entire circuit connected to said bridge taking substantial damage.

In conventional DC-motor drive arrangements, the H-bridge is controlled so as to switch directly between a positive and a negative voltage, i.e. between an active state and a reverse active state.

Referring to Equation 1, the method of controlling the drive arrangement according to present invention effectively reduces the time derivative of the current IDC due to the applied voltage being lower, i.e. being a lot smaller compared to switching directly to a negative voltage to a positive or vice versa. Instead, ideally zero voltage is applied in the pause state although in reality the inductivity of the circuit will cause a low voltage to still be present even during the pause state.

In line with the aforementioned, circuits with capacitivity or inductivity the current will require time to go from a maximum or minimum value to zero, thus transient current will be present in the H-bridge 96 between the solid states. In other words, the switch between the steady states, i.e. the active state and the pause state, causes a transient response. A transient response in the H-bridge 96 causes wear and may potentially damage the components of said H-bridge. The decreased current derivative increases the stability of the drive arrangement 200 and reduces the risk for the transient response to reach critical levels.

As a consequence of the more stable current behavior achieved by the method of controlling the drive arrangement 200, the amplitude of the current is reduced. A method of controlling a drive arrangement which causes lower ripple is thereby achieved.

PWM typically implements a rectangular pulse wave with which an analog signal is converted to a digital. To obtain the rectangular pulse wave signal, for example the current provided by the DC-motor 34, the signal is integrated so as to obtain an average value according to the following general principle:

$$\bar{y} = \frac{1}{T}\int_0^T f(t)dt \quad (2)$$

Thus, the average value $\bar{y}$ of the pulse waveform f(t) is obtained by integration of said pulse wave form f(t) with the time T for one duty cycle D. The duty cycle D refers to the ratio of the time $t_a$ for an active state in relation to the said time T for one duty cycle D and is achieved according to the following:

$$D = \frac{t_a}{T} \quad (3)$$

Drive arrangements with H-bridges are conventionally controlled by means of switches which are selectively activated and deactivated based on the rectangular pulse wave obtained. To provide the rectangular pulse wave required for the control method, the H-bridge is connected to a logic circuit. Said logic circuit may in its most simple form comprise a comparator referenced to 0 whose output is 1 or 0 if the input signal is positive or negative and an integrator whose output rises or falls with each 1 or 0 received. The integrator has to comprise a low-pass filter to achieve the desired function the logic circuit.

With reference to present invention, the DC-motor current IDC is measured directly and the switches are controlled directly based on the difference between said DC-motor current and the set points of the current.

Thereby, no integration circuit is required. Instead, only a comparator referencing the reference currents IREF1 and IREF2 may be used. Preferably, IREF1 and IREF2 are substantially of the same size, whereby a two level quantizer may be used. Thus, a less complex drive arrangement is enabled.

Alternatively, the reference currents may be stored in the memory 33 operatively connected to the controller 32 or 232.

The potential absence of an integration circuit increases the speed of the switching between the active and pause state due to no time consuming integration of input signals having to take place. In the transient state between the active state and the pause state both current and voltage is present in the switches of the H-bridge causing an increase in losses. Since the transient periods between the active state and pause states are associated with the majority of the losses generated by the switches of a DC-motor drive arrangement, the increased switching speed reduces the transient periods resulting in lower losses overall in the drive arrangement 200.

Also, the integration performed in the integration circuit of a conventional drive arrangement requires parameters associated with the DC-motor such as duty cycle time and so on. In order to calibrate the drive arrangement an operator has to trim said drive arrangement when the DC-motor is introduced to the drive arrangement in order for the drive arrangement to function properly.

Drive arrangements in automated entrance system may be subjected to heavy wear due to large number of openings and closings of the door leafs as well as potential damage due to human intervention and sabotage in public areas.

Thus, there is often a need for replacing the DC-motor of the drive arrangement. In conventional drive arrangements this would require trimming and calibration of the automatic door operator which is time consuming and a complex process.

Due to present method according to the invention not requiring any parameters of the DC-motor 34 for controlling the drive arrangement 200, the often cumbersome and time consuming process of trimming the drive arrangement may be avoided when the DC-motor is replaced.

According to present method, only the reference currents IREF1 and IREF2 are required in order to control the drive arrangement 200. Said reference currents are preferably set based on the properties of the entrance system or automatic door operator as a whole and does not need altering when the DC-motor is replaced. Hence, no trimming is required. Said method thus allows for a more maintenance friendly drive arrangement 200 is achieved.

The continuous switching and resulting ripple occurring in the drive arrangement causes wear of the components as well as power losses. To further address this issue, there is a need to achieve a drive arrangement and a method for controlling said drive arrangement which increases the durability of the drive arrangement.

Hence, the method may further comprise storing in the memory 33 of the controller 32 data associated with which of the switches SA1, SA2, SB1, SB2 were activated during the pause state.

To allow for an advantageous distribution of power losses, the method may further comprise obtaining from the data stored in the memory which of the switches SA1, SA2, SB1, SB2 were activated during a preceding pause state and alternating the switches activated during the pause state in relation to the preceding pause state.

Preferably, this is performed such that the switches which were activated during the preceding pause state are deactivated during the pause state.

Thus, the pause state alternates between a pause state where the upper leg switches SA1 and SB1 are activated and the lower leg switches SA2 and SB2 are deactivated and a pause state where the lower leg switches SA2 and SB2 are activated and the upper leg switches SA1 and SB1 are deactivated.

The alternating between the upper and lower leg switches in the pause state effectively distributes the load and power losses between the switches and H-bridge. This reduces the load on the components of the H-bridge 96 without the requiring complex additional circuitry and/or components dimensioned for higher currents and voltages. Thus, a more cost-efficient and less complex drive arrangement is enabled.

Again referring to FIG. 2, in one embodiment, the drive arrangement 200 further comprises a timer 120 for setting a periodic response timing. The timer 120 may be connected to the controller 32. For each time period set by the timer, the DC-motor current IDC is compared to the reference currents IREF1 and IREF2 which preferably are equal. Hence, the DC-motor current IDC may be compared to a single reference current IREF equaling the reference currents IREF1 and IREF2.

The method may comprise to for each time period set by the timer 120 compare the DC-motor current IDC and the single reference current IREF by means of calculating the difference between said single reference current IREF and DC-motor current IDC.

The switching of states from the pause state to the active state or vice versa may be initiated in response to the calculated difference changing from positive to negative or vice versa.

The DC-motor current IDC may be deemed to exceed the first reference current IREF1 when the calculated difference between the singe reference current IREF and the DC-motor current IDC changes from positive to negative or vice-versa. Accordingly, the switching to the pause state may be initiated.

In one embodiment, the switching to the pause state is initiated immediately upon aforementioned detection.

In one embodiment, the switching to the pause state is initiated immediately in response to a comparator signal indicating the singe reference current IREF and the DC-motor current IDC changing from positive to negative or vice-versa, i.e. when the comparator value changes sign. Said comparator signal may be generated by said comparator and received by the controller 32.

The DC-motor current IDC may be deemed to fall below the second reference current IREF2 when the calculated difference between the singe reference current IREF and the DC-motor current IDC changes from negative to positive or vice-versa, i.e. when the comparator value changes sign. Accordingly, the switching back to the active state may be initiated.

In one embodiment, the switching back to the active state is initiated in response to a new time set period signal, i.e. a signal indicating the timer switching to a new time period, from the timer 120.

In one embodiment, the method further comprises D/A-converting the DC-motor current IDC prior to comparing it to the reference currents IREF1 and IREF2 or the single reference current IREF. The comparing may be performed by means of a comparator in the form of a quantizer connected to the H-bridge 96. The quantizer may be configured to compare the DC-motor current IDC and the single reference current IREF.

In one embodiment, the controller 32 may be configured to compare the DC-motor current IDC to the reference currents IREF1 and IREF2 or the single reference current IREF. The method may thus comprise obtaining from the associated memory 33 the reference current IREF, IREF1 and/or IREF2 and compare the DC-motor current IDC to said reference current.

Referring to table 1, in some situations, the reverse active state may be utilized. For example, it may be utilized when the automatic door operator 30 is required to brake the opening movement of the door member or reverse the movement of the door member by providing a reverse torque.

Thus, in one embodiment, the drive arrangement 200 may be configured to also operate in a four quadrant mode sliding mode. The method may accordingly further comprise switching to the reverse active state when the DC-motor current IDC falls below the second reference current IREF2.

The method may further comprise detecting if the DC-motor current IDC is positive or negative and switching from the pause state to the reverse active state when the DC-motor current IDC falls below a positive second reference current IREF2 and switching from the pause state to the active state when the DC-motor current IDC falls below a negative second reference current IREF2. Thereby, a four quadrant sliding mode may be achieved.

Figure 3C:
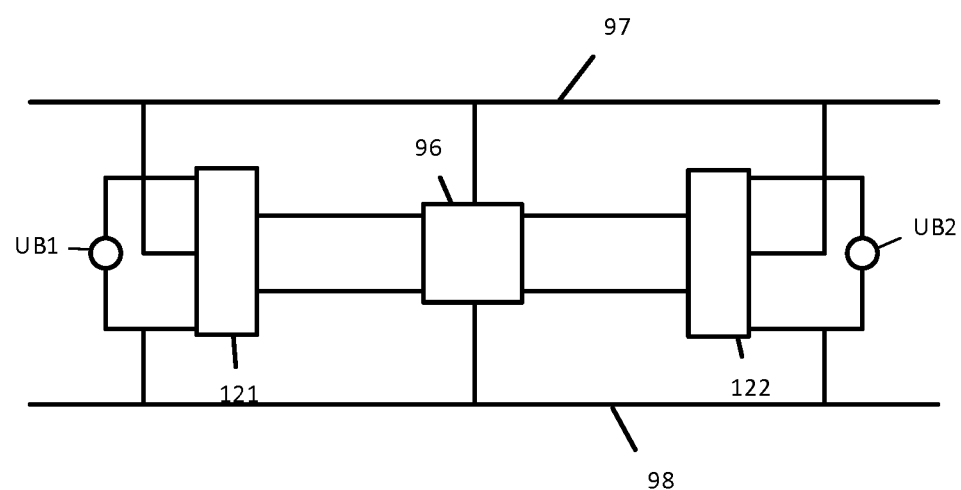
FIG. 3c is a schematic figure of a drive arrangement according to one embodiment.

Referring to FIG. 3C, an embodiment where bootstrap circuits are utilized to charge the capacitors of the switches is schematically depicted.

Particularly n-channel transistors, i.e. N-mosfets, and IGBTs may require a substantial positive charge applied to the gate in order to be activated. As a result, the capacitors may lose their charge due to parasitic gate current and non-ideal internal resistance in the switches.

To allow for the capacitors of the switches to recharge, the capacitors in the switches may be refilled by means of the capacitors of the bootstrap circuit when deactivated in order to avoid losses.

Thus, the first leg switches SA1 and SA2 may be connected to a first bootstrap circuit 121. The second leg switches SB1 and SB2 may be connected to a second bootstrap circuit 122. The first bootstrap circuit 121 may be adapted to provide a first bootstrap voltage UB1. The second bootstrap circuit 122 may be adapted to provide a second bootstrap voltage UB2. Bootstrap circuits are commonly known in the arts and will not be described in further detail.

The method may accordingly further comprise charging each of the switches deactivated, i.e. the capacitors of said switches, by means of the respective bootstrap voltage during the pause state. For example, in a pause state where the upper leg switches SA1 and SB1 are deactivated and the lower leg switches SA2 and SB2 are active, the lower leg switches SA2 and SB2 may be charged by means of said bootstrap voltages.

According to one aspect of the invention, a drive arrangement 200 for an automatic door operator 30 of an entrance system 10 having one or more movable door members D1 . . . Dm is provided. The automatic door operator 30 is for causing movements of the one or more movable door members D1 . . . Dm between a closed position and an opened position, respectively.

As described with reference to FIG. 3a-b, the drive arrangement 200 comprises the DC-motor 34 for driving the automatic door operator 30, the H-bridge (96) and the controller 32 for controlling the drive arrangement 200.

The H-bridge 96 comprises the first leg A and the second leg B, the first leg A and second leg B both being connected to the first voltage supply line 97 and the second voltage supply line 98. The first voltage supply line 97 has a higher voltage than the second voltage supply line 98.

The first leg A comprises the upper first leg switch SA1 and the lower first leg switch SA2 connected in series and the second leg comprises the upper second leg switch SB1 and the lower second leg switch SB2 connected in series.

The DC-motor 34 is connected to the first leg A and the second leg B between the upper first leg switch SA1 and the lower first leg switch SA2 and the upper second leg switch SB1 and the lower second leg switch SB2, respectively.

The aforementioned method may be performed by means of the controller 32 of the drive arrangement 200, which may be the main controller 32 of the door operator or a separate controller 232. The controller 32 is configured to switch to an active state of the drive arrangement 200, wherein the upper first leg switch SA1 and the lower second leg switch SB2 are activated and wherein the lower first leg switch SA2 and the upper second leg switch SB2 are deactivated.

The controller 32 is further configured to compare the DC-motor current IDC to a first reference current IREF1 and switch to a pause state of the drive arrangement 200, wherein the upper leg switches SA1, SB1 or the lower leg switches SA2, SB2 are deactivated, when the DC-motor current IDC exceeds the first reference current IREF1, Further, the controller 32 is configured to switch back to the active state when the DC-motor current IDC falls below a second reference current IREF2.

As previously described with reference to FIG. 3 the DC-motor current is measured by means of the current sensor IM.

The controller 32 may be configured to store in a memory 33 of said controller 32 or 232 data associated with which of the switches SA1, SA2, SB1, SB2 were activated during the pause state.

To alternate between the switches in the pause state of the drive arrangement 2000, the controller 32 may be further configured to obtain from the data stored in the memory 33 which of the switches SA1, SA2, SB1, SB2 were activated during a preceding pause state and alternate the switches activated during the pause state in relation to the preceding pause state.

With advantage, the controller is configured to switch such that the switches which were activated during the preceding pause state are deactivated during the pause state.

Preferably, the voltage potential between the first and second voltage supply line 97 and 98 is between 20 and 45 Volt and even more preferably between 30 and 40 Volt.

In one embodiment, where the first leg switches SA1 and SA2 are connected to the previously descried first bootstrap circuit 121 adapted to provide the first bootstrap voltage UB1 and the second leg switches SB1 and SB2 are connected to the second bootstrap circuit 122 adapted to provide the second bootstrap voltage UB2. The controller 32 or 232 may be configured to cause charging of each of the switches SA1, SA2, SB1, SB2 deactivated during the pause state by means of the respective bootstrap voltage UB1 and/or UB2.

According to one aspect of the invention an automatic door operator 30 for entrance system 10 is provided. The entrance system 10 has one or movable door members D1 . . . Dm, whereby the automatic door operator 30 is for causing movements of the one or more movable door members D1 . . . Dm between a closed position and an opened position, respectively. The automatic door operator 30 comprises the drive arrangement 200 as previously described.

The invention has been described above in detail with reference to embodiments thereof. However, as is readily understood by those skilled in the art, other embodiments are equally possible within the scope of the present invention, as defined by the appended claims.

The invention claimed is:

1. A method for controlling a drive arrangement for an automatic door operator of an entrance system having one or more movable door members, wherein the automatic door operator is for causing movements of the one or more movable door members between a closed position and an opened position, respectively, the drive arrangement comprising a DC-motor for driving the automatic door operator, a H-bridge and a controller for controlling the drive arrangement, wherein the H-bridge comprises a first leg and a second leg, the first leg and second leg both being connected to a first voltage supply line and a second voltage supply line, the first voltage supply line having a higher voltage than the second voltage supply line, wherein the first leg comprises an upper first leg switch and a lower first leg switch connected in series and the second leg comprises an upper second leg switch and a lower second leg switch connected in series, the DC-motor being connected to the first leg and the second leg between the upper first leg switch and the lower first leg switch and the upper second leg switch and the lower second leg switch, respectively, the method comprising:
switching to an active state of the drive arrangement, wherein the upper first leg switch and the lower second leg switch are activated and wherein the lower first leg switch and the upper second leg switch are deactivated;
measuring a DC-motor current from the DC-motor;
comparing the DC-motor current to a first reference current;
further switching from the active state to a pause state of the drive arrangement, wherein only the upper leg switches or the lower leg switches are activated, when the DC-motor current exceeds the first reference current; and
yet further switching from the paused state back to the active state when the DC-motor current falls below a second reference current.

2. The method according to claim 1, wherein an absolute value of the first reference current substantially equals an absolute value of the second reference current.

3. The method according to claim 1, wherein the upper first leg switch, the lower first leg switch, the upper second leg switch, and the lower second leg switch comprise a plurality of switches, the method further comprising:
storing in a memory of the controller data associated with the ones of the plurality of switches that were activated during the pause state.

4. The method according to claim 3, the method further comprising:
obtaining from the data stored in the memory the ones of the plurality of switches that were activated during a preceding pause state; and
alternating the ones of the plurality of switches activated during the pause state in relation to the preceding pause state, such that the ones of the plurality of switches which were activated during the preceding pause state are deactivated during the pause state.

5. The method according to claim 1, wherein the switches are transistors.

6. The method according to claim 5, wherein the upper leg switches are p-channel transistors and the lower leg switches are n-channel transistors.

7. The method according to claim 5, wherein each of the switches are n-channel transistors.

8. The method according to claim 5, wherein each of the switches are insulated-gate bipolar transistors.

9. The method according to claim 1, wherein the first leg switches are connected to a first bootstrap circuit adapted to provide a first bootstrap voltage and the second leg switches are connected to a second bootstrap circuit adapted to provide a second bootstrap voltage, wherein the method further comprises:
charging each of the switches deactivated during the pause state by means of the respective bootstrap voltage.

10. A drive arrangement for an automatic door operator of an entrance system having one or more movable door members, wherein the automatic door operator is for causing movements of the one or more movable door members between a closed position and an opened position, respectively,
the drive arrangement comprising a DC-motor for driving the automatic door operator, a H-bridge and a controller for controlling the drive arrangement,
wherein the H-bridge comprises a first leg and a second leg, the first leg and second leg both being connected to a first voltage supply line and a second voltage supply line, the first voltage supply line having a higher voltage than the second voltage supply line,
wherein the first leg comprises an upper first leg switch and a lower first leg switch connected in series and the second leg comprises an upper second leg switch and a lower second leg switch connected in series, the DC-motor being connected to the first leg and the second leg between the upper first leg switch and the lower first leg switch and the upper second leg switch and the lower second leg switch, respectively.

11. The drive arrangement according to claim 10, wherein the DC-motor is connected to a current sensor IM configured to measure a DC-motor current from the DC-motor, wherein the controller configured to:
switch to an active state of the drive arrangement, wherein the upper first leg switch and the lower second leg switch are activated and wherein the lower first leg switch and the upper second leg switch are deactivated,
compare the DC-motor current to a first reference current,
switch to a pause state of the drive arrangement, wherein the upper leg switches or the lower leg switches are deactivated, when the DC-motor current exceeds the first reference current, and
switch back to the active state when the DC-motor current falls below a second reference current.

12. The drive arrangement according to claim 11, wherein an absolute value of the first reference current substantially equals an absolute value of the second reference current.

13. The drive arrangement according to claim 11, wherein the upper first leg switch, the lower first leg switch, the upper second leg switch, and the lower second leg switch comprise a plurality of switches, and where the controller is configured to store in a memory of the controller data associated with the ones of the plurality of switches that were activated during the pause state.

14. The drive arrangement according to claim 13, wherein the controller is further configured to obtain from the data stored in the memory the ones of the plurality of the switches that were activated during a preceding pause state and alternate the ones of the plurality of switches activated during the pause state in relation to the preceding pause state such that the ones of the plurality of switches which were activated during the preceding pause state are deactivated during the pause state.

15. The drive arrangement according to claim 11, wherein the first leg switches are connected to a first bootstrap circuit adapted to provide a first bootstrap voltage and the second leg switches are connected to a second bootstrap circuit adapted to provide a second bootstrap voltage, wherein the controller is configured to cause charging of each of the switches deactivated during the pause state by means of the respective bootstrap voltage.

16. The drive arrangement according to claim 10, wherein the switches are transistors.

17. The drive arrangement according to claim 16, wherein the upper leg switches are p-channel transistors and the lower leg switches are re-channel transistors.

18. The drive arrangement according to claim 16, wherein each of the switches are n-channel transistors.

19. The drive arrangement according to claim 16, wherein each of the switches are insulated-gate bipolar transistors.

20. An automatic door operator for an entrance system having one or more movable door members, whereby the automatic door operator is for causing movements of the one or more movable door members between a closed position and an opened position, respectively, the automatic door operator comprising a drive arrangement according to claim 10.

* * * * *